(12) United States Patent
Kang et al.

(10) Patent No.: US 10,717,654 B2
(45) Date of Patent: Jul. 21, 2020

(54) METHOD OF PREPARING MESOPOROUS CARBON MATERIAL WITH LAYERED STRUCTURE USING HUMIN

(71) Applicant: Dongguan University of Technology, Dongguan (CN)

(72) Inventors: Shimin Kang, Dongguan (CN); Chong Wang, Dongguan (CN); Guichen He, Dongguan (CN); Chengming Luo, Dongguan (CN); Xiaoyan Cai, Dongguan (CN); Wanxiang Zeng, Dongguan (CN); Xiaoyuan Lin, Dongguan (CN)

(73) Assignee: Dongguan University of Technology, Guangdong (CN)

( * ) Notice: Subject to any disclaimer, the term of this patent is extended or adjusted under 35 U.S.C. 154(b) by 163 days.

(21) Appl. No.: 16/155,604

(22) Filed: Oct. 9, 2018

(65) Prior Publication Data

US 2019/0345035 A1 Nov. 14, 2019

(30) Foreign Application Priority Data

May 9, 2018 (CN) .......................... 2018 1 0439623

(51) Int. Cl.
*B29C 64/10* (2017.01)
*C01B 32/318* (2017.01)
(Continued)

(52) U.S. Cl.
CPC ............ *C01B 32/318* (2017.08); *B33Y 10/00* (2014.12); *B33Y 70/00* (2014.12); *B29C 64/10* (2017.08)

(58) Field of Classification Search
None
See application file for complete search history.

(56) References Cited

U.S. PATENT DOCUMENTS

| | | | | | |
|---|---|---|---|---|---|
| 1,908,485 | A | * | 5/1933 | Meigs | ................... C08G 65/34 536/120 |
| 3,293,200 | A | * | 12/1966 | MacGregor | ............ C09J 161/06 524/74 |

(Continued)

FOREIGN PATENT DOCUMENTS

| CN | 106512940 A | * | 3/2017 |
|---|---|---|---|
| CN | 107698260 A | * | 2/2018 |

OTHER PUBLICATIONS van Zandvoort et al, Full, Reactive Solubilization of Humin Byproducts by Alkaline Treatment and Characterization of the Alkali-Treated Humins Formed, ACS Sustainable Chem. Eng., 2015, 3, 533-543 (Year: 2015).*

(Continued)

*Primary Examiner* — Timothy Kennedy
(74) *Attorney, Agent, or Firm* — JCIPRNET

(57) ABSTRACT

The present invention relates to a method of preparing a mesoporous carbon material with layered structure using humin. The preparation method provided by the present invention may prepare a mesoporous carbon with layered structure, especially a mesoporous carbon with layered structure having a regular frame. Prepared by the present invention, the mesoporous carbon with layered structure having the regular frame has a specific surface area up to 1000 $m^2/g$ and an average pore diameter of 3 nm-6 nm. Such method solves the present problems of low use efficiency of humin and severe waste of resources.

10 Claims, 1 Drawing Sheet

(51) Int. Cl.
　　　*B33Y 10/00*　　　(2015.01)
　　　*B33Y 70/00*　　　(2020.01)

(56) References Cited

U.S. PATENT DOCUMENTS

| 2012/0042566 | A1* | 2/2012 | Mackintosh | C08H 8/00 |
| | | | | 44/530 |
| 2017/0362194 | A1* | 12/2017 | Jansen | C07D 233/58 |
| 2018/0169617 | A1* | 6/2018 | Brody | B22F 3/008 |
| 2018/0305511 | A1* | 10/2018 | Mija | C08K 5/0008 |
| 2019/0031797 | A1* | 1/2019 | Dyson | C08F 12/26 |
| 2019/0270854 | A1* | 9/2019 | Mija | H01G 9/2027 |

OTHER PUBLICATIONS

Kang et al, Synthesis of Humin-Phenol-Formaldehyde Adhesive, Polymers, 2017, 9, 373 (Year: 2017).*

Hoang et al, Humin based by-products from biomass processing as a potential carbonaceous source for synthesis gas production, Royal Society of Chemistry, Green Chem, 2015, 17, 959-972 (Year: 2015).*

Chinese Patent Office, First Office Action, Translated, Application 201810439623, dated Mar. 6, 2019 (Year: 2019).*

* cited by examiner

METHOD OF PREPARING MESOPOROUS CARBON MATERIAL WITH LAYERED STRUCTURE USING HUMIN

TECHNICAL FIELD

The present invention relates to an application field of humin, and specifically relates to a method of preparing a mesoporous carbon material with layered structure using humin.

BACKGROUND

As the increasing consumption of non-renewable fossil resources, using renewable biomass to prepare energy fuels and chemicals has become a significant technology. A large amount of high-value platform compounds, such as 5-hydroxymethyl furfural and acetylpropionic acid, can be prepared by hydrolysis of lignocellulosic biomass and saccharide resources. However, during the hydrolysis of these lignocellulosic biomass and one saccharide resource, a great deal of by-product, humin, is generated. A mass yield of humin can be up to 20 wt %-25 wt % of saccharides raw material, and even up to 30%-60% based on a selectivity of carbon.

Humin is a macromolecule rich in carbon, and generally is deemed to be a waste for its low utility value. Owing to the generation of humin, use efficiency of carbon is low during the hydrolysis of the lignocellulosic biomass and the saccharide resource, which makes a severe waste in resources. Conversion of humin into a high-value material and chemical is of great significance for enhancing use efficiency of the lignocellulosic biomass and the saccharide resource and solving the problem of waste in carbon resources. Mesoporous carbon material, as an excellent novel carbon material, is expected a lot to play an important role in aspects such as catalyst support, hydrogen storage material and electrode material.

Therefore, it is of great significance to use humin as the raw material to prepare a mesoporous carbon material.

SUMMARY OF THE INVENTION

The objective of the present invention is to overcome the deficiency of the prior art and to provide a method of preparing a mesoporous carbon material with layered structure using humin. The preparation method provided by the present invention may prepare a mesoporous carbon with layered structure, especially a mesoporous carbon with layered structure having a regular frame. Prepared by the present invention, the mesoporous carbon with layered structure having the regular frame has a specific surface area up to 1000 $m^2/g$ and an average pore diameter of 3 nm-6 nm. Such method solves the present problems of low use efficiency of humin and severe waste of resources.

In order to realize the above objective, the present invention adopts the following technical solution:

A method of preparing a mesoporous carbon material with layered structure using humin, which is performed as follows:

S1: obtaining a slurry-like solution by a reaction of humin and an alkali solution under a hydrothermal condition;

S2: obtaining a gel-like substance by a reaction of the slurry-like solution and a formaldehyde solution at 70° C.-80° C. for 30 to 75 minutes;

S3: injecting the gel-like substance into a 3D printing injector, and obtaining a precursor with layered structure by performing printing according to a designed program; and S4: performing high-temperature calcination of the precursor of S3 in an inert atmosphere, and obtaining the mesoporous carbon material with layered structure;

wherein a mass ratio of humin to formaldehyde is between 1:0.04 and 1:0.4.

The preparation method provided by the present invention may prepare a mesoporous carbon with layered structure, especially a mesoporous carbon with layered structure having a regular frame. Prepared by the present invention, the mesoporous carbon with layered structure having the regular frame has a specific surface area up to 1000 $m^2/g$ and an average pore diameter of 3 nm-6 nm. Besides, the mesoporous carbon material has a regular layered frame structure, and the number of layers and the size of the frame of the mesoporous carbon material may also be 3D printed through the program. The method provided by the present invention solves the present problems of low use efficiency of humin and severe waste of resources.

Preferably, in S2, a reaction temperature is 75° C. and a reaction time is 50 minutes.

Preferably, in S2, the mass ratio of humin to formaldehyde is 1:0.3.

Preferably, in S1, the hydrothermal condition is performing the reaction at 170° C.-210° C. for 6 hours or above.

Preferably, in S1, a mass molar ratio of humin to the alkali solution is between 1:0.01 and 1:0.03.

Preferably, the alkali solution is a strong alkali solution, and more preferably, the strong alkali solution is sodium hydroxide or potassium hydroxide.

Preferably, a concentration of the strong alkali solution is greater than 2 mol/L.

Preferably, a mass concentration of the formaldehyde solution is 37%.

Preferably, in S4, temperature of the high-temperature calcination is 400° C.-700° C., and time for the high-temperature calcination is 1 to 2 hours.

Preferably, the mesoporous carbon with layered structure is a mesoporous carbon with layered structure having a regular frame.

In the present invention, during the printing, the program may be designed according to the required number of layers and the required size of the mesoporous carbon material via a computer software.

Compared with the prior art, the present invention has following beneficial effects:

In the present invention, humin, used as a raw material, is treated with the alkali solution, then reacts with formaldehyde, subjected to the 3D printing and the high-temperature calcination, and converted into a high-value mesoporous carbon material with layered structure. Such mesoporous carbon material has characteristics of high specific surface area and large pore size. The preparation method provided by the present invention may prepare a mesoporous carbon with layered structure, especially a mesoporous carbon with layered structure having a regular frame. Prepared by the present invention, the mesoporous carbon with layered structure having the regular frame has a specific surface area up to 1000 $m^2/g$ and an average pore diameter of 3 nm-6 nm. Besides, with simple process and convenient operation, such method has industrialized application prospect.

Prepared by the present invention, the mesoporous carbon material with layered structure having the regular frame may reduce an effect of an inner diffusion resistance during adsorption, form a relatively short molecular diffusion distance, improve contact of the substance to be adsorbed with an inner porous structure of the mesoporous carbon material, and realize a deep adsorption. Such layered structure having the regular frame is favorable to placement and piling during the industrial application, for example, placement of the mesoporous carbon material with regular structure may be realized by a simple series connection or parallel connection, which greatly enhances the present application range of the mesoporous carbon material.

DETAILED DESCRIPTION OF THE PREFERRED EMBODIMENT

The present invention is further described as follows in combination with specific embodiments and accompanied drawings, but the embodiments do not limit the present invention in any way. Unless specified, reagents, methods and apparatus used in the present invention are conventional reagents, methods and apparatus in the art.

Unless specified, reagents and materials used in the present invention are commercially available.

Embodiment 1

A method of preparing a mesoporous carbon material with layered structure using humin, which was performed as follows:

(1) 4 g of humin and 20 mL of 3 mol/L KOH solution were added in a reaction tank and subjected to a reaction at a temperature of 200° C. for 10 hours, and a black slurry-like solution was obtained;

(2) 4 mL of 37% formaldehyde solution was added into the slurry-like solution mentioned above, and they were subjected to a mechanical stirring with a stirring rate of 300 rpm, heated to 70° C. at a heating rate of 10° C./min, and subjected to a reaction at 70° C. for 60 minutes, and a black gel-like substance was obtained;

(3) The black gel-like substance in step (2) was poured into a 25 mL injector equipped with a syringe needle, and the injector was fixed on a 3D printer. A 3D printing program was designed as follows: 1 cm in length, 1 cm in width, with a line interval of 0.2 mm and a number of printing layers of 12.

(4) According to the printing program designed in step (3), the black gel-like substance was subjected to 3D printing, and a precursor of the mesoporous carbon material with layered structure having the regular frame was obtained;

(5) The precursor of the mesoporous carbon material obtained in step (4) was put into a tubular furnace filled with nitrogen (a flow velocity of nitrogen was 100 ml/min), and subjected to calcination at 700° C. for 2 hours, and a crude product of the mesoporous carbon material was obtained. After cooling, the crude product of the mesoporous carbon material was washed with deionized water and dried, and a mesoporous carbon material with a length and a width of about 0.9 cm and a height of about 0.5 cm was obtained. Such mesoporous carbon material had a specific surface area of 824 m$^2$/g and an average pore diameter of 4.1 nm.

Figure 1:
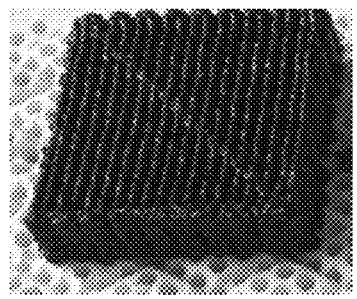
FIG. 1 shows a precursor with layered structure having a regular frame, which is obtained by 3D printing in Embodiment 1.
Figure 2:
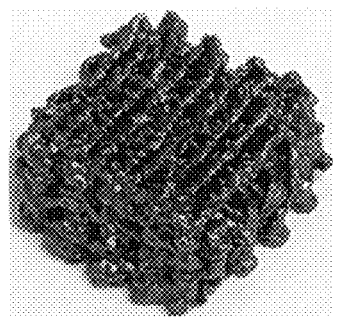
FIG. 2 shows a mesoporous carbon material with layered structure having a regular frame, which is prepared in Embodiment 1.
Figure 3:
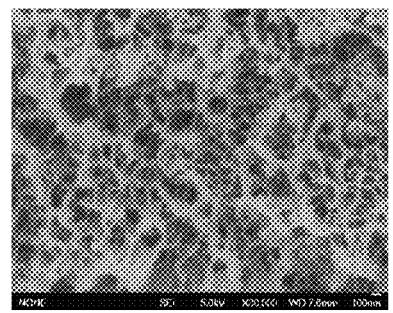
FIG. 3 shows a SEM image of a surface appearance of the mesoporous carbon material with layered structure having the regular frame, which is prepared in Embodiment 1.

FIGS. 1, 2 and 3 respectively show the precursor, the mesoporous carbon material and a SEM image of a surface appearance of the mesoporous carbon material, which have a layered structure and a regular frame, and were obtained by 3D printing in the present embodiment. It was found by scanning electron microscope (SEM) that a framework surface of the mesoporous carbon material was full of pores.

Embodiment 2

A method of preparing a mesoporous carbon material with layered structure using humin, which was performed as follows:

(1) 4 g of humin and 20 mL of 5 mol/L KOH solution were added in a reaction tank and subjected to a reaction at a temperature of 170° C. for 12 hours, and a black slurry-like solution was obtained;

(2) 1.5 mL of 37% formaldehyde solution was added into the slurry-like solution mentioned above, and they were subjected to a mechanical stirring with a stirring rate of 300 rpm, heated to 80° C. at a heating rate of 10° C./min, and subjected to a reaction at 80° C. for 40 minutes, and a black gel-like substance was obtained;

(3) The black gel-like substance in step (2) was poured into a 25 mL injector equipped with a syringe needle, and the injector was fixed on a 3D printer. A 3D printing program was designed as follows: 0.7 cm in length, 0.7 cm in width, with a line interval of 0.2 mm and a number of printing layers of 8.

(4) According to the printing program designed in step (3), the black gel-like substance was subjected to 3D printing, and a precursor of the mesoporous carbon material with layered structure having the regular frame was obtained;

(5) The precursor of the mesoporous carbon material obtained in step (4) was put into a tubular furnace filled with nitrogen (a flow velocity of nitrogen was 100 ml/min), and subjected to calcination at 700° C. for 2 hours, and a crude product of the mesoporous carbon material was obtained. After cooling, the crude product of the mesoporous carbon material was washed with deionized water and dried, and a mesoporous carbon material with layered frame of which a length and a width was about 0.6 cm and a height was about 0.3 cm was obtained. Such mesoporous carbon material had a specific surface area of 1011 m$^2$/g and an average pore diameter of 3.3 nm.

Embodiment 3

A method of preparing a mesoporous carbon material with layered structure using humin, which was performed as follows:

(1) 4 g of humin and 20 mL of 2 mol/L KOH solution were added in a reaction tank and subjected to a reaction at a temperature of 210° C. for 12 hours, and a black slurry-like solution was obtained;

(2) 4 mL of 37% formaldehyde solution was added into the slurry-like solution mentioned above, and they were subjected to a mechanical stirring with a stirring rate of 300 rpm, heated to 75° C. at a heating rate of 10° C./min, and subjected to a reaction at 75° C. for 40 minutes, and a black gel-like substance was obtained;

(3) The black gel-like substance in step (2) was poured into a 25 mL injector equipped with a syringe needle, and the injector was fixed on a 3D printer. A 3D printing program was designed as follows: 3 cm in length, 3 cm in width, with a line interval of 0.2 mm and a number of printing layers of 30.

(4) According to the printing program designed in step (3), the black gel-like substance was subjected to 3D printing, and a precursor of the mesoporous carbon material with layered structure having the regular frame was obtained;

(5) The precursor of the mesoporous carbon material obtained in step (4) was put into a tubular furnace filled with nitrogen (a flow velocity of nitrogen was 100 ml/min), and subjected to calcination at 500° C. for 2 hours, and a crude product of the mesoporous carbon material was obtained. After cooling, the crude product of the mesoporous carbon material was washed with deionized water and dried, and a mesoporous carbon material with layered frame of which a length and a width was about 2.7 cm and a height was about 1.3 cm was obtained. Such mesoporous carbon material had a specific surface area of 265 $m^2/g$ and an average pore diameter of 5.8 nm.

Embodiment 4

A method of preparing a mesoporous carbon material with layered structure using humin, which was performed as follows:

(1) 4 g of humin and 15 mL of 4 mol/L KOH solution were added in a reaction tank and subjected to a reaction at a temperature of 190° C. for 12 hours, and a black slurry-like solution was obtained;

(2) 0.4 mL of 37% formaldehyde solution was added into the slurry-like solution mentioned above, and they were subjected to a mechanical stirring with a stirring rate of 300 rpm, heated to 75° C. at a heating rate of 10° C./min, and subjected to a reaction at 75° C. for 75 minutes, and a black gel-like substance was obtained;

(3) The black gel-like substance in step (2) was poured into a 25 mL injector equipped with a syringe needle, and the injector was fixed on a 3D printer. A 3D printing program was designed as follows: 1 cm in length, 1 cm in width, with a line interval of 0.2 mm and a number of printing layers of 15.

(4) According to the printing program designed in step (3), the black gel-like substance was subjected to 3D printing, and a precursor of the mesoporous carbon material with layered structure having the regular frame was obtained;

(5) The precursor of the mesoporous carbon material obtained in step (4) was put into a tubular furnace filled with nitrogen (a flow velocity of nitrogen was 100 ml/min), and subjected to calcination at 700° C. for 1 hour, and a crude product of the mesoporous carbon material was obtained. After cooling, the crude product of the mesoporous carbon material was washed with deionized water and dried, and a mesoporous carbon material with layered frame was obtained.

Embodiment 5

A method of preparing a mesoporous carbon material with layered structure using humin, which was performed as follows:

(1) 4 g of humin and 16 mL of 5 mol/L KOH solution were added in a reaction tank and subjected to a reaction at a temperature of 180° C. for 10 hours, and a black slurry-like solution was obtained;

(2) 1 mL of 37% formaldehyde solution was added into the slurry-like solution mentioned above, and they were subjected to a mechanical stirring with a stirring rate of 300 rpm, heated to 80° C. at a heating rate of 10° C./min, and subjected to a reaction at 80° C. for 40 minutes, and a black gel-like substance was obtained;

(3) The black gel-like substance in step (2) was poured into a 25 mL injector equipped with a syringe needle, and the injector was fixed on a 3D printer. A 3D printing program was designed as follows: 1.2 cm in length, 1.2 cm in width, with a line interval of 0.2 mm and a number of printing layers of 18.

(4) According to the printing program designed in step (3), the black gel-like substance was subjected to 3D printing, and a precursor of the mesoporous carbon material with layered structure having the regular frame was obtained;

(5) The precursor of the mesoporous carbon material obtained in step (4) was put into a tubular furnace filled with nitrogen (a flow velocity of nitrogen was 100 ml/min), and subjected to calcination at 400° C. for 1.5 hours, and a crude product of the mesoporous carbon material was obtained. After cooling, the crude product of the mesoporous carbon material was washed with deionized water and dried, and a mesoporous carbon material with layered frame was obtained.

Embodiment 6

A method of preparing a mesoporous carbon material with layered structure using humin, which was performed as follows:

(1) 4 g of humin and 20 mL of 3.5 mol/L KOH solution were added in a reaction tank and subjected to a reaction at a temperature of 200° C. for 12 hours, and a black slurry-like solution was obtained;

(2) 2 mL of 37% formaldehyde solution was added into the slurry-like solution mentioned above, and they were subjected to a mechanical stirring with a stirring rate of 300 rpm, heated to 70° C. at a heating rate of 10° C./min, and subjected to a reaction at 70° C. for 60 minutes, and a black gel-like substance was obtained;

(3) The black gel-like substance in step (2) was poured into a 25 mL injector equipped with a syringe needle, and the injector was fixed on a 3D printer. A 3D printing program was designed as follows: 2.5 cm in length, 2.5 cm in width, with a line interval of 0.2 mm and a number of printing layers of 25.

(4) According to the printing program designed in step (3), the black gel-like substance was subjected to 3D printing, and a precursor of the mesoporous carbon material with layered structure having the regular frame was obtained;

(5) The precursor of the mesoporous carbon material obtained in step (4) was put into a tubular furnace filled with nitrogen (a flow velocity of nitrogen was 100 ml/min), and subjected to calcination at 600° C. for 2 hours, and a crude product of the mesoporous carbon material was obtained. After cooling, the crude product of the mesoporous carbon material was washed with deionized water and dried, and a mesoporous carbon material with layered frame was obtained.

Embodiment 7

A method of preparing a mesoporous carbon material with layered structure using humin, which was performed as follows:

(1) 4 g of humin and 20 mL of 5 mol/L KOH solution were added in a reaction tank and subjected to a reaction at a temperature of 200° C. for 12 hours, and a black slurry-like solution was obtained;

(2) 3.5 mL of 37% formaldehyde solution was added into the slurry-like solution mentioned above, and they were subjected to a mechanical stirring with a stirring rate of 300 rpm, heated to 80° C. at a heating rate of 10° C./min, and subjected to a reaction at 80° C. for 30 minutes, and a black gel-like substance was obtained;

(3) The black gel-like substance in step (2) was poured into a 25 mL injector equipped with a syringe needle, and the injector was fixed on a 3D printer. A 3D printing program was designed as follows: 3 cm in length, 3 cm in width, with a line interval of 0.2 mm and a number of printing layers of 15.

(4) According to the printing program designed in step (3), the black gel-like substance was subjected to 3D printing, and a precursor of the mesoporous carbon material with layered structure having the regular frame was obtained;

(5) The precursor of the mesoporous carbon material obtained in step (4) was put into a tubular furnace filled with nitrogen (a flow velocity of nitrogen was 100 ml/min), and subjected to calcination at 600° C. for 2 hours, and a crude product of the mesoporous carbon material was obtained. After cooling, the crude product of the mesoporous carbon material was washed with deionized water and dried, and a mesoporous carbon material with layered frame was obtained.

Objectives, technical solutions and beneficial effects of the present invention are further described by the above specific implementations. It should be understood that the above description is merely specific implementation of the present invention, and does not limit the scope of protection of the present invention. All modifications, equivalent substitution and improvement within the spirit and the principle of the present invention shall be included in the scope of protection of the present invention.

What is claimed is:

1. A method of preparing a mesoporous carbon material with layered structure using humin, characterized in that, the method is performed as follows:

S1: obtaining a slurry-like solution by a reaction of the humin and an alkali solution under a hydrothermal condition;

S2: obtaining a gel-like substance by a reaction of the slurry-like solution and a formaldehyde solution at 70° C.-80° C. for 30 to 75 minutes, wherein a mass ratio of the humin to the formaldehyde is between 1:0.04 and 1:0.4;

S3: injecting the gel-like substance into a 3D printing injector, and obtaining a precursor with layered structure by performing printing according to a designed program; and S4: performing high-temperature calcination of the precursor of S3 in an inert atmosphere, and obtaining the mesoporous carbon material with layered structure.

2. The method according to claim 1, wherein in S2, the reaction temperature is 75° C. and a reaction time is 50 minutes.

3. The method according to claim 1, wherein in S2, the mass ratio of humin to formaldehyde is 1:0.3.

4. The method according to claim 1, wherein in S1, the hydrothermal condition is performing the reaction at 170° C.-210° C. for 6 hours or above.

5. The method according to claim 1, wherein in S1, a mass molar ratio of the humin to the alkali solution is between 1:0.01 and 1:0.03.

6. The method according to claim I, wherein the alkali solution is a strong alkali solution.

7. The method according to claim 6, wherein a concentration of the strong alkali solution is greater than 2 mol/L.

8. The method according to claim 1, wherein a mass concentration of the formaldehyde solution is 37%.

9. The method according to claim 1, wherein in S4, temperature of the high-temperature calcination is 400° C.-700° C., and time for the high-temperature calcination is 1 to 2 hours.

10. The method according to claim 1, wherein the mesoporous carbon with layered structure is a mesoporous carbon with layered structure having a regular frame.

* * * * *